US007862753B2

(12) United States Patent
Yamaguchi et al.

(10) Patent No.: US 7,862,753 B2
(45) Date of Patent: Jan. 4, 2011

(54) COMPRESSION MOLDING METHOD FOR CUTTING INSERT

(75) Inventors: Yukihiro Yamaguchi, Kawasaki (JP); Kuniyoshi Shindo, Kawasaki (JP)

(73) Assignee: Tungaloy Corporation, Kanagawa (JP)

( * ) Notice: Subject to any disclaimer, the term of this patent is extended or adjusted under 35 U.S.C. 154(b) by 0 days.

(21) Appl. No.: 12/586,106

(22) Filed: Sep. 16, 2009

(65) Prior Publication Data

US 2010/0007053 A1 Jan. 14, 2010

Related U.S. Application Data

(63) Continuation of application No. PCT/JP2008/055125, filed on Mar. 19, 2008.

(30) Foreign Application Priority Data

Mar. 20, 2007 (JP) ............................ 2007-073698

(51) Int. Cl.
*B29C 43/02* (2006.01)

(52) U.S. Cl. ....................... 264/40.5; 425/141; 425/149

(58) Field of Classification Search ....................... None
See application file for complete search history.

(56) References Cited

U.S. PATENT DOCUMENTS 5,288,440 A * 2/1994 Katagiri et al. ............ 264/40.5
6,074,584 A * 6/2000 Hinzpeter et al. .......... 264/40.5
6,325,609 B1 * 12/2001 Shimada ..................... 425/140
2008/0145466 A1 * 6/2008 Beane ........................ 425/149

FOREIGN PATENT DOCUMENTS

| | | | |
|---|---|---|---|
| JP | 1-181997 | | 7/1989 |
| JP | 5-57496 | A | 3/1993 |
| JP | 11-156606 | A | 6/1999 |
| JP | 11-333599 | A | 12/1999 |
| JP | 2002-3906 | A | 1/2002 |
| JP | 2007-152366 | A | 7/2007 |

OTHER PUBLICATIONS

International Search Report issued by the International Searching Authority (ISA/JP) on May 13, 2008 in connection with International Application No. PCT/JP2008/055125.

Written Opinion of the International Searching Authority (ISA/JP) issued May 13, 2008 in connection with International Application No. PCT/JP2008/055125.

* cited by examiner

*Primary Examiner*—Mary Lynn F Theisen
(74) *Attorney, Agent, or Firm*—John P. White; Cooper & Dunham LLP

(57) ABSTRACT

According to an aspect of the invention, a compression molding method for a cutting insert, in which molding powder filled into a molding space defined by a die, an upper punch, and a lower punch is compression-molded by the upper and lower punches, includes, sliding both the upper and lower punches individually to positions just short of estimated stop positions obtained for design by means of a position controller, and then sliding the punches by means of a load controller so that a predetermined pressure is reached.

12 Claims, 7 Drawing Sheets

COMPRESSION MOLDING METHOD FOR CUTTING INSERT

CROSS-REFERENCE TO RELATED APPLICATIONS

This is a Continuation Application of PCT Application No. PCT/JP2008/055125, filed Mar. 19, 2008, which was published under PCT Article 21(2) in Japanese.

This application is based upon and claims the benefit of priority from prior Japanese Patent Application No. 2007-073698, filed Mar. 20, 2007, the entire contents of which are incorporated herein by reference.

BACKGROUND OF THE INVENTION

1. Field of the Invention

The present invention relates to a compression molding method for a cutting insert, and more particularly, to a compression molding method in which the accuracy of contours (diameter of inscribed circle) of the upper and lower surfaces of a cutting insert is improved.

2. Description of the Related Art

In a conventional compression molding method for molding powder, a certain volume of molding powder is filled into a molding space defined by a die and a pair of punches, upper and lower, and compression molding is performed by means of the upper and lower punches. In this known compression molding method, priority is given to the point that each punch is stopped at a predetermined position.

Further, there are powder molding machines in which a molding section is composed of a die and punches. In these powder molding machines, each punch is mechanically driven by a ball screw, and the drive mechanism is connected with a servomotor and provided with a sensor for detecting the compressive force of the punch. Some powder molding machines are provided with control means that compares a measured value obtained by the sensor and a predetermined reference value and controls the servomotor so that the measured value corresponds to the reference value. These powder molding machines have an effect that a compact can be compression-molded to a uniform density (Patent Document 1: Jpn. Pat. Appln. KOKAI Publication No. 1-181997).

According to the compression molding method in which the upper and lower punches are stopped at the predetermined positions, a fixed filling weight is obtained by making the volume of molding powder constant. The shape, operation setting, etc., of a filling device are optimized in order to make the volume of molding powder constant. If the particle size of the molding powder is subject to variation, however, a problem is caused that the density of the compact becomes so uneven that the dimensional accuracy after sintering is reduced. Thus, if a cutting insert formed of cemented carbide, cermet, etc., is used as a cutting edge of a cutting tool, therefore, the edge dimensions of the cutting edge considerably vary at the time of replacement, so that the machining accuracy is reduced. Further, the shape, operation setting, etc., of the filling device must be separately managed for each of different molding powder particle sizes, which is troublesome.

In the compression molding method using the powder molding machine described in Jpn. Pat. Appln. KOKAI Publication No. 1-181997 (see FIG. 1), the control is performed based on the compressive force between the die and punches, so that the distance between the upper and lower punches fluctuates depending on fluctuations of the fill of the molding powder. In order to suppress this fluctuation, the molding powder volume must be accurately controlled. If a compression operation is performed without filling the molding powder due to malfunctioning of the device, moreover, the upper and lower punches may collide with each other and break the die. If the die is not broken, the dimensions after sintering may be out of tolerance, thereby causing defective production.

BRIEF SUMMARY OF THE INVENTION

The present invention has been made in order to solve the above problems, and its object is to provide a compression molding method for a cutting insert, capable of accurately forming the contours of upper and lower surfaces.

An aspect of the invention is a compression molding method for a cutting insert, in which molding powder is filled into a molding space defined by a die, an upper punch, and a lower punch, and the molding powder is compression-molded by the upper and lower punches, comprising moving both the upper and lower punches individually to positions just short of stop positions (hereinafter referred to as "estimated stop positions") determined from values for the design of a product to be molded by means of a position controller, and then moving the punches by means of a load controller so that a predetermined pressure is reached.

Further, an aspect of the invention is a compression molding method for a cutting insert, in which molding powder is filled into a molding space defined by a die, an upper punch, and a lower punch, and the molding powder is compression-molded by the upper and lower punches, comprising moving both the upper and lower punches individually to positions just short of stop positions (hereinafter referred to as "estimated stop positions") determined from values for the design of a product to be molded by means of a position controller, then moving one of the punches to the estimated stop position, and then further moving the other punch by means of a load controller so that a predetermined pressure is reached.

DETAILED DESCRIPTION OF THE INVENTION

Figure 1:
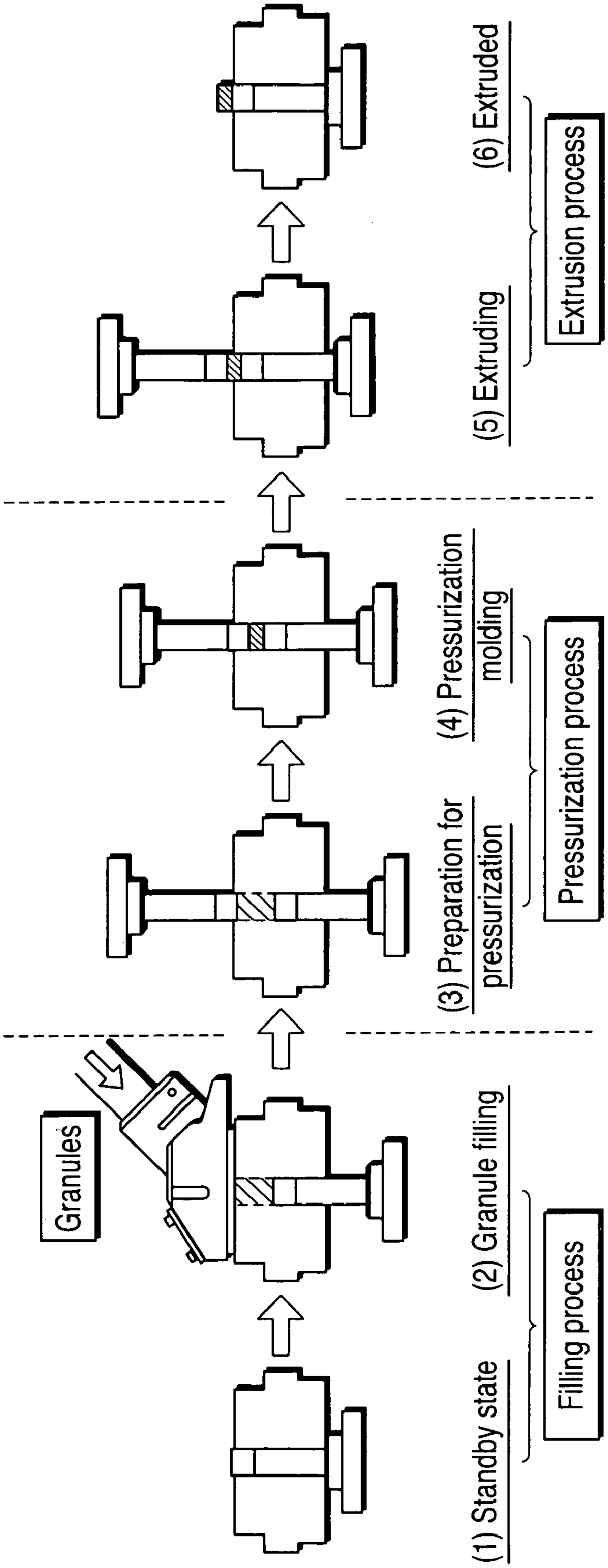
FIG. 1 is a diagram showing an example of one cycle of manufacturing processes for a compact for a cutting insert in time series.
Figure 2:
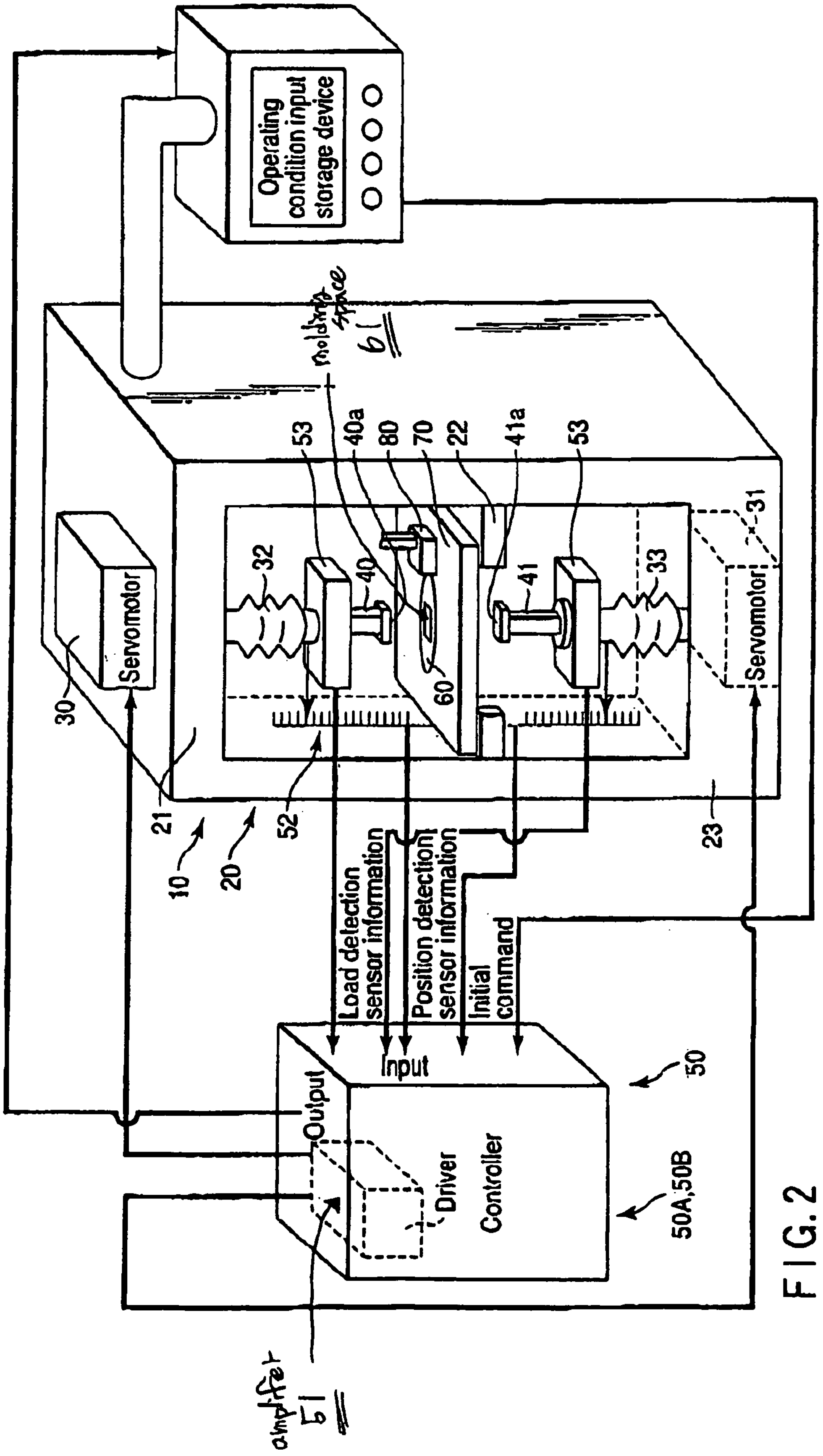
FIG. 2 is a schematic view showing an example of a compression molding machine used in a compression molding method according to the present invention.
Figure 3:
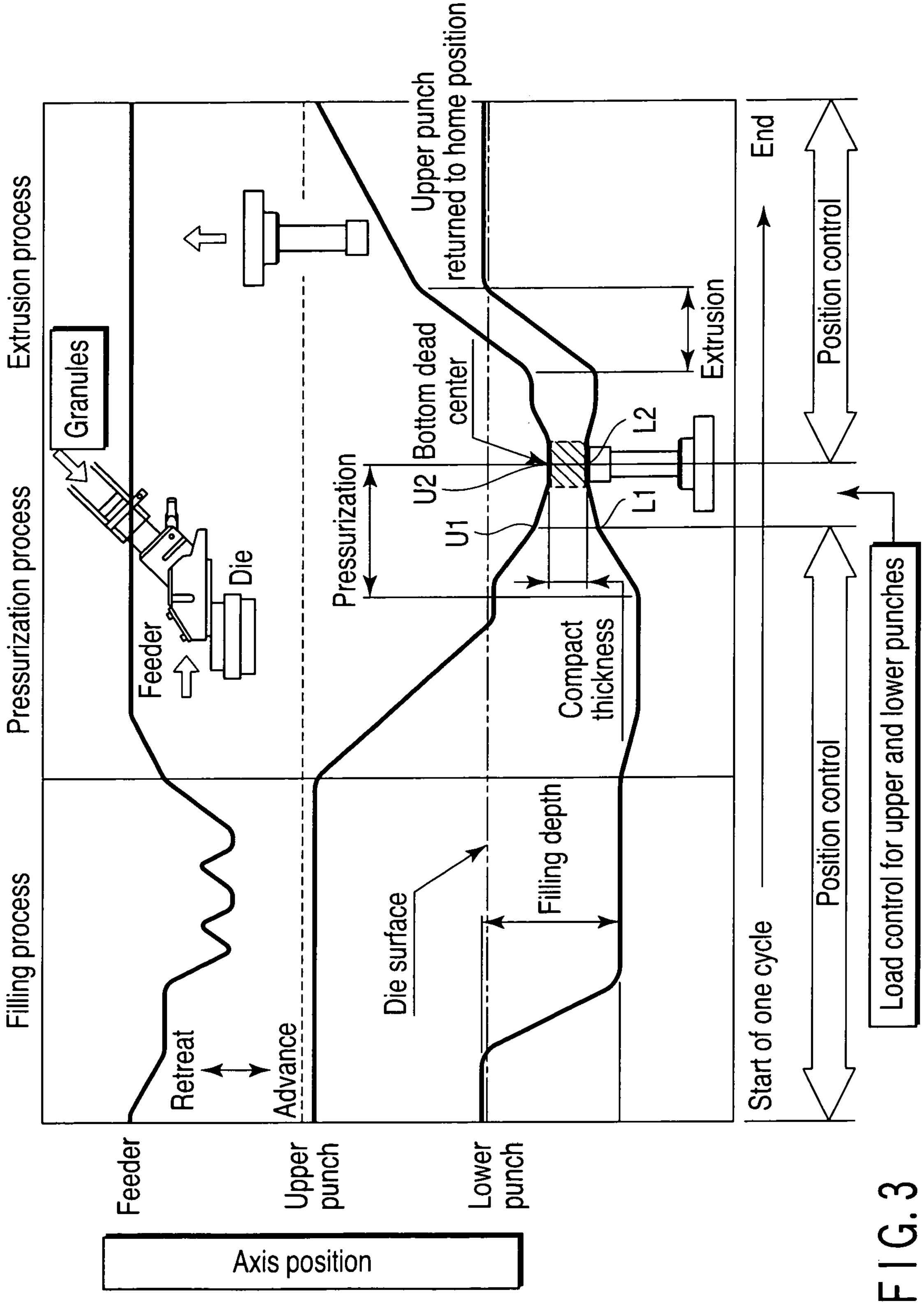
FIG. 3 is a position-time diagram of an upper punch and lower punch in one cycle.
Figure 4:
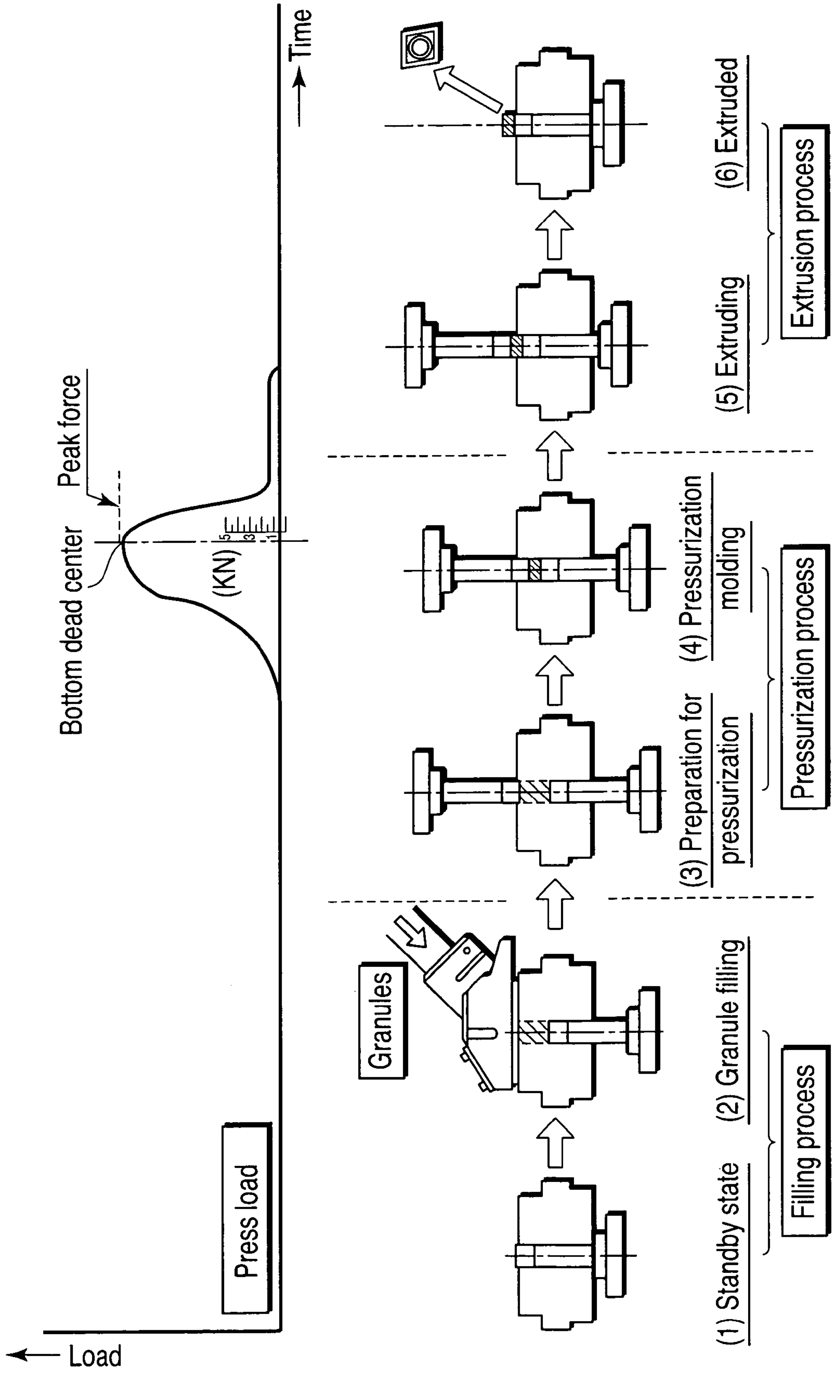
FIG. 4 is a load-time diagram of the punches in one cycle.
Figure 5A:
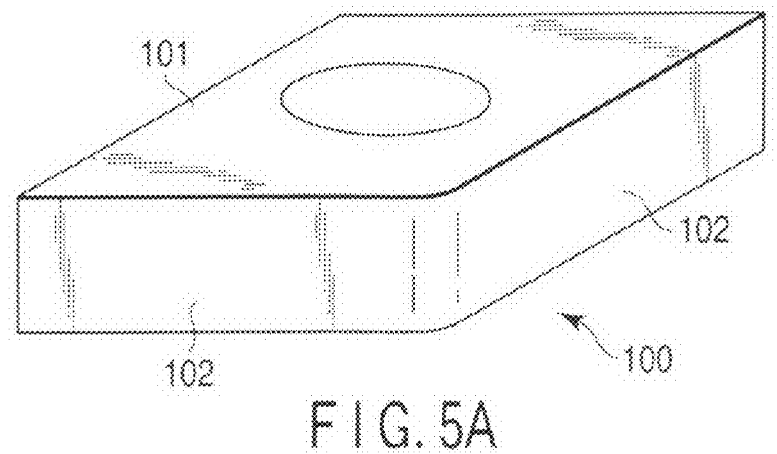
FIG. 5A is a view showing an example of a negative-type cutting insert manufactured by the compression molding method.

An embodiment of a compression molding method for a cutting insert according to the present invention will now be described with reference to the drawings. FIG. 1 is a view sequentially showing one cycle of a manufacturing process for a compact for the cutting insert. FIG. 2 is a schematic view of a compression molding machine used in the compression molding method. FIG. 3 is a position-time diagram for an upper punch and lower punch in one cycle. FIG. 4 is a position-time diagram for a punch in one cycle. FIG. 5A, etc., are views illustrating a negative-type cutting insert manufactured by the compression molding method.

FIG. 1 shows processes for manufacturing the compact for the cutting insert in time series. As illustrated in this drawing, one cycle is composed of a filling process for filling molding powder into a molding space that is defined by a die, upper punch, and lower punch, a pressurization process for compression-molding the filled molding powder, and an extrusion process for extruding the compression-molded compact from the molding space. These processes are performed by means of a compression molding machine 10 typically shown in FIG. 2.

The compression molding machine 10 includes a frame 20 provided with an upper wall 21, middle wall 22, and lower wall 23. Ball nuts or ball screws (not shown) are rotatably supported by the upper wall 21 and lower wall 23, and punch driving servomotors 30 and 31 are mounted on the walls, respectively. Gears fixed to the ball nuts or ball screws and gears fixed to respective output shafts of the servomotors 30 and 31 are connected by means of timing belts that are passed around and between them. Alternatively, they are directly connected by coupling.

An upper punch driving ball screw 32 threadedly engages with the ball nut or ball screw that is mounted on the upper wall 21. An upper punch 40 is mounted on the lower end of the ball screw 32 for replacement so that a pressing force of the ball screw 32 directly acts thereon. Ball screws 32 and 33 may be conventional ball screw mechanisms.

A lower punch driving ball screw 33 threadedly engages with the ball nut or ball screw that is mounted on the lower wall 23. A lower punch 41 is mounted on the upper end of the ball screw 33 for replacement so that a pressing force of the ball screw 33 directly acts thereon.

The upper and lower ball nuts or ball screws paired with the upper and lower punch driving ball screws 32 and 33 in threaded engagement therewith are mechanisms that individually convert rotary motions into linear motions along the same axis and cause the servomotors to drive the upper and lower punches 40 and 41, individually.

A die mounting portion 70 is mounted on the middle wall 22. The die mounting portion 70 is formed with a vertical through-hole, and a die 60 is mounted on the die mounting portion 70 for replacement.

As shown in FIG. 2, the die 60 is provided with a molding space 61 in the form of a vertical through-hole. The molding space 61 of the die 60 is accurately formed into the plan-view shape of the compact for the cutting insert to be manufactured. The upper and lower punches 40 and 41 are formed so that they can be precisely fitted into the molding space 61 of the die 60 and vertically moved relative to the die 60.

The servomotors 30 and 31 are AC servomotors, which are individually connected through a servo amplifier 51 to a controller 50 by a signal line and power line.

The controller 50 is composed of an input section, storage section, comparison section, output section, and control section for adjusting the operations of these sections, and performs operation control for the upper and lower punches 40 and 41, and in addition, the next feedback control process. The controller 50 combines a position controller 50A and load controller 50B. Alternatively, the position controller 50A and load controller 50B may be constructed independently of each other.

In the position controller 50A, position detection values of the upper and lower punches 40 and 41 and set values for the respective positions of the upper and lower punches 40 and 41 are input to the input section. The position detection values are detected by position detection sensors 52. The position detection sensors 52 are composed of linear scales attached to the upper and lower ball screws 32 and 33, individually.

The storage section is provided with operation programs for various operations of the upper and lower punches 40 and 41 and stores the set values input to the input section. The comparison section compares the detection values from the position detection sensors 52 with the stored set values with timings controlled by the control section, and determines whether or not the set values are reached by the respective degrees of movement of the punches 40 and 41. If the set values are not reached by the detection values, the drive of the servomotors 30 and 31 is continued. If it is concluded that the set values are reached, the drive of the servomotors 30 and 31 is stopped. Thus, the servomotors 30 and 31 are controlled based on the movement degrees of the punches 40 and 41. Although the position detection sensors 52 should preferably be linear scales 52 with high resolution, they may alternatively be linear encoders, linear sensors, potentiometers, or the like.

In the load controller 50B, on the other hand, load detection values of the upper and lower punches 40 and 41 and set values for the respective loads of the upper and lower punches 40 and 41 are input to the input section through a keyboard or the like. The load detection values are detected by load detection sensors 53. The load detection sensors 53 are composed of piezoelectric devices attached to the upper and lower ball screws 32 and 33, individually.

The storage section is provided with operation programs for various operations of the upper and lower punches 40 and 41 and stores the set values input to the input section. The comparison section compares the detection values from the load detection sensors 53 with the stored set values with timings controlled by the control section, and determines whether or not the set values are reached by the respective loads of the punches 40 and 41. If the set values are not reached by the detection values, the drive of the servomotors 30 and 31 is continued. If it is concluded that the set values are reached, the drive of the servomotors 30 and 31 is stopped. Thus, the servomotors 30 and 31 are controlled based on the loads produced between the die 60 and the punches 40 and 41. Although the load detection sensors 53 should preferably be piezoelectric devices with high detection accuracy, they may alternatively be strain gages, load cells, or the like.

Further, positions where the position detection sensors 52 or load detection sensors 53 are mounted are not limited to the ball screws 30 and 31, and may be any other spots that are associated with drive mechanisms for the upper and lower punches 40 and 41.

The keyboard for inputting the set values of the positions and loads of the upper and lower punches 40 and 41, position detection sensors 52 for detecting the positions of the upper and lower punches 40 and 41, load detection sensors 53 for detecting the loads of the upper and lower punches 40 and 41, controller 50 and servo amplifier 51 connected therewith, etc., constitute control means for the servomotors 30 and 31.

As shown in FIG. 2, a feeder 80 is placed on the respective upper surfaces of the die 60 and die mounting portion 70. The feeder 80 is connected with a supply pipe at its upper part and has an opening at the bottom part. The supply pipe is connected to a raw material supply mechanism (not shown) such that the molding powder is introduced from the raw material supply mechanism into the feeder 80 through the supply pipe. The feeder 80 is slidingly reciprocated along the respective upper surfaces of the die 60 and die mounting portion 70 in synchronism with the compression molding operation by a drive unit (not shown), such as a servomotor, solenoid, or the like.

The following is a description of the compression molding method using the compression molding machine. The upper and lower punches 40 and 41 and die 60 are individually selected and set depending on a product to be molded. For the upper and lower punches 40 and 41, programs are selected by the controller from the operation programs stored in the storage section, and operations are performed according to the programs.

FIG. 3 shows changes in vertical position of the upper and lower punches 40 and 41 in one cycle. Illustrated for the feeder 80 is a change in lateral position along the upper surface of the die 60. As shown in this drawing, the upper punch 40 is initially drawn out of the die 60 and moved up to a retracted position. The lower punch 41 is fitted in the molding space of the die 60 so that the upper surface of the lower punch 41 forms the bottom surface of the molding space.

If this standby state is confirmed, the drive unit, e.g., the servomotor, solenoid, or the like, is driven to move the feeder 80 onto the molding space, whereupon the molding powder is filled into the molding space (see the filling process of FIG. 1). After the feeder 80 is laterally swung several times on the molding space, it is returned to its original position. Thus, the molding powder filling efficiency can be increased, and the accuracy of fill can be improved.

Then, the upper punch driving servomotor 30 is driven, and the ball nut or ball screw is rotated by means of the gear, timing belt, and gear. Further, the upper punch driving ball screw 32 is lowered, and the upper punch 40 is fitted into the molding space of the die 60 (see the "Preparation for pressurization" of the Pressurization process shown in FIG. 1). Thus, the molding powder in the molding space is compression-molded as the upper and lower punches 40 and 41, which are directly pressed by the upper punch driving ball screw 32 and lower punch driving ball screw 33, respectively, are slid to their stop positions (bottom dead centers) (see the "Pressurization molding" of the Pressurization process shown in FIG. 1).

As shown in FIG. 3, the upper and lower punches 40 and 41 first slide under conventional position control based on the set operation programs and feedback control of the position controller 50A based on the detection values from the position detection sensors 52 and the stored set values, thereby pressurizing the molding powder. After having reached set positions (positions U1 and L1 in FIG. 3) just short of their respective bottom dead centers, the punches also slide under conventional load control based on the set operation programs and feedback control of the load controller 50B based on the detection values from the load detection sensors 53 and the stored set values, and stop when the set loads are reached (positions U2 and L2 in FIG. 3).

Thereafter, the upper and lower punches 40 and 41 move away from each other, whereupon the compact is released from the pressurization. In this movement, the punches slide upward with the distance between them accurately controlled after having slid for a predetermined set degree under the conventional position control and feedback control by the position controller 50A. When a position where the compact is removed is reached, only the lower punch 41 stops, and the upper punch 40 returns to its standby position.

The compact having reached the removal position is removed by a takeout device (not shown) incorporated in the compression molding machine and is moved to a predetermined position. In a series of operations of the upper and lower punches 40 and 41, the respective vertical positions of the punches 40 and 41 change during each cycle, as shown in FIG. 3. In the stop position, as shown in FIG. 4, the load slightly exceeds the set load. The load controller 50B controls the sliding motions and stop positions of the upper and lower punches 40 and 41 to minimize (or approximate to zero) the excess.

The following is a further detailed description of this processing.

First, the respective stop positions (estimated stop positions) of the upper and lower punches 40 and 41 are obtained depending on the shape of the product to be molded. Specifically, stop positions where a designed thickness of the product to be molded are defined are obtained.

As shown in FIG. 3, the lower punch 41 descends from the upper surface position of the die 60 in the filling process, falls down to a position at the vertically arrowed lower end of a filling depth, and maintains that position. As this is done, the molding powder is fed from the feeder 80 into the die 60. At a point in time indicated by the boundary between the filling process and pressurization process, the lower punch 41 slightly descends as illustrated from there. This position is at the lowest end of the lower punch 41 shown in FIG. 3.

Further, the upper punch 40 starts to descend at the point in time indicated by the boundary between the filling process and pressurization process. Thus, before the filling process is finished, the upper punch 40 is kept removed from the die 60. Then, it slightly enters the die 60 through the upper surface of the die 60. The upper punch 40 starts to descend after maintaining its position awhile in the die 60.

Further, the lower punch 41 starts to ascend when the upper punch 40 having entered the die 60 is kept in its intermediate position. The molding powder starts to be pressurized by the entry of the upper punch 40 into the die 60 and the ascent of the lower punch 41. This point in time is represented by the left-hand end of a horizontal arrow indicative of pressurization.

The molding powder is pressurized by the descent of the upper punch 40 and the ascent of the lower punch 41. In the illustrated example, a distance covered by the upper punch 40 that descends after the start of pressurization and a distance covered by the lower punch 41 that ascends are about 5 mm each. This value varies depending on the product to be molded.

The control of the descent of the upper punch 40 and ascent of the lower punch 41 is based on position control for 95% of the distance of about 5 mm, and is switched to load control, thereafter. Specifically, 95% of the degree of movement from the start of pressurization to the stop positions determined in designing the product to be molded, that is, the estimated stop positions, is based on the position control, and the movement control is switched to the load control when the remaining movement degree becomes 5%. The switching position of the upper punch 40 is designated by U1, and that of the lower punch 41 by U2.

Thus, the upper and lower punches 40 and 41 continue to descend and ascend until the load controller 50B detects that the load is at a predetermined pressure. When the load controller 50B detects that the load is at the predetermined pressure, the descent of the upper punch 40 and the ascent of the lower punch 41 are stopped. In FIG. 3, the upper punch 40 is in the arrowed bottom dead center or the position U2, and the lower punch 41 in the position L2. Thus, the stop positions under the load control are not always coincident with the estimated stop positions determined in designing the product.

Further, the load control may be performed for the remainder of any other percentage than 5% of the entire process. However, there is an effect that the time for the entire movement including the movement under the position control, that is, process time, can be minimized and the molding powder can be fully pressurized with a necessary pressure by making a movement under the load control for the remainder, 5%, of the pressurization process. Thus, 5% produces a favorable result in pressurization such that the product is molded by compressing the molding powder filled into the die 60 to about ⅓, as shown in FIG. 3, etc.

The compact for the cutting insert compression-molded by controlling the loads of the upper and lower punches 40 and 41 in this manner is given a very constant density, so that the contours of its upper and lower surfaces embossed by the upper and lower punches 40 and 41 can be accurately shaped. In the cutting insert formed with rake faces on the upper and lower surfaces and cutting edges on their peripheral edge portions, therefore, the dimensional accuracy of the rake faces and cutting edges after sintering is very high. Accordingly, the accuracy of the edge position of a cutting tool fitted with the cutting insert becomes higher than in the conventional case. Since the variation of the edge position at the time of the replacement of the cutting insert is smaller than in the conventional case, moreover, the finished surface accuracy is improved considerably. Also in the case where the peripheral surfaces of the cutting insert are ground after sintering, error and variation of a grinding tolerance are so small that the grinding tolerance can be reduced. Thus, the grinding costs and material costs can be cut. Furthermore, the density of the compact is very uniform, and the sintered alloy characteristics are high and stable. Thus, a strong alloy can be obtained, and a long-lived tool that serves as an excellent cutting tool edge can be stably formed.

The upper and lower punches 40 and 41 stop when the set loads are reached. Since the stop positions fluctuate depending on fluctuations of the fill of the molding powder and the like, the thickness of the compact for the cutting insert may vary, in some cases. After sintering, on the other hand, the upper and/or lower surface of the cutting insert is ground by means of a grinding wheel or the like. Thus, the cutting insert is finished to an accurate thickness.

Figure 5B:
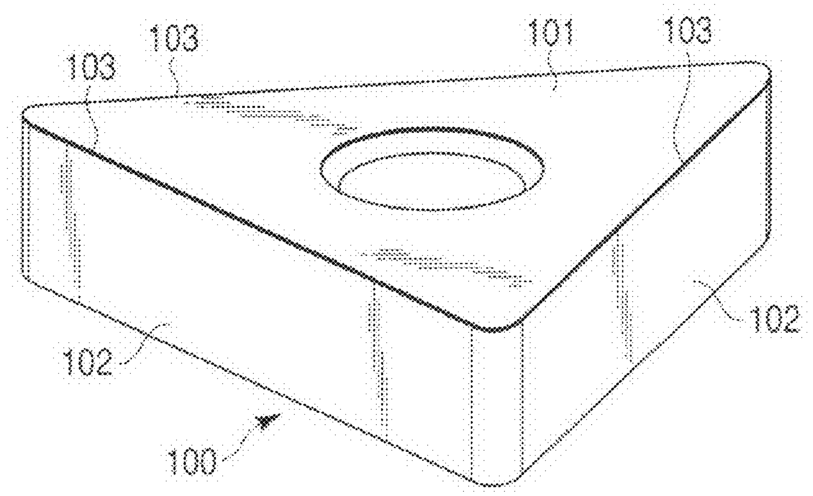
FIG. 5B is a view showing another example of the negative-type cutting insert manufactured by the compression molding method.
Figure 5C:
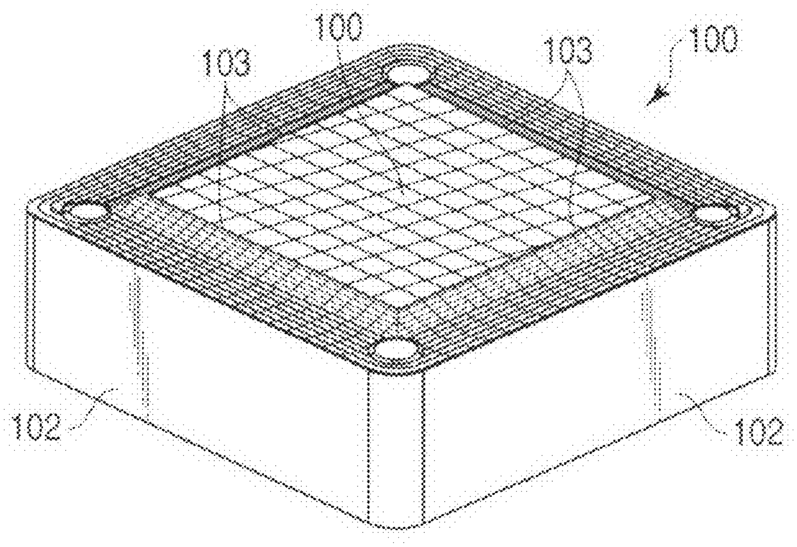
FIG. 5C is a view showing another example of the negative-type cutting insert manufactured by the compression molding method.

FIGS. 5A, 5B and 5C individually show cutting inserts manufactured by the compression molding method. The cutting inserts shown in FIGS. 5A and 5B are provided with rake faces on their upper and lower surfaces, individually. The cutting insert shown in FIG. 5C is formed with a rake face on its upper surface only and has chip breaker grooves along its cutting edge ridges. As shown in these drawings, this method is suitable for molding a compact for negative-type cutting inserts in which the contours of the upper and lower surfaces are identical and coaxial. This is because the compact manufactured by this compression molding method is formed, after sintering, with rake faces 101 individually on the upper and lower surfaces having accurate contours and cutting edges 103 on the peripheral edge portions of the upper and lower surfaces. When the upper and lower surfaces of a cutting insert 100 are alternatively used as the rake faces 101 or when the cutting insert 100 is replaced, therefore, the edge position accuracy of the cutting edges 103 of a cutting tool is improved considerably. If the contours of the upper and lower surfaces are shaped by grinding the peripheral surfaces that form flank faces 102 after sintering, errors and variations of grinding tolerances of the peripheral surfaces are so small that the grinding tolerances can be reduced. Thus, the grinding costs and material costs can be cut.

Further, the distance between a distal end face 40*a* of the upper punch at the bottom dead center and a distal end face 41*a* of the lower punch is converted from the detection values of the position detection sensors 52. In the comparison section of the position controller 50A, the resulting value is compared with an tolerable value input to the storage section, and it is determined whether or not the value is within tolerance. If the value is out of tolerance, the compact is sorted out as a non-conforming product and rejected as molding powder for reproduction without being delivered to a subsequent sintering process. Thus, non-conforming products are reduced and the molding powder can be saved, so that the economy is improved.

This is a method to deal with the case where the stop positions are considerably deviated from the values required in designing the product if the movement is stopped when the predetermined pressure is reached with the descent of the upper punch 40 and the ascent of the lower punch 41 subjected to the aforementioned load control. Specifically, the positions reached when the upper and lower punches 40 and 41 are stopped under the load control are measured by the position detection sensors 52. The measured distance between the upper and lower punches 40 and 41 is compared with a reference value. If the measured distance is within a threshold of the reference value, the molded compact is treated as a conforming product. If the measured distance is outside the threshold, however, the compact is regarded as a non-conforming product.

Preferably, each of the upper and lower punches 40 and 41 should be composed of a plurality of split punches that can slide independently of one another. The individual split punches are independently slidable by means of ball screws, and their slide degrees and loads can be controlled separately. According to these split punches, loads acting on the upper and lower surfaces of the compact for the cutting insert can be accurately controlled for each split division, so that the density of the compact can be made more uniform.

Figure 6:
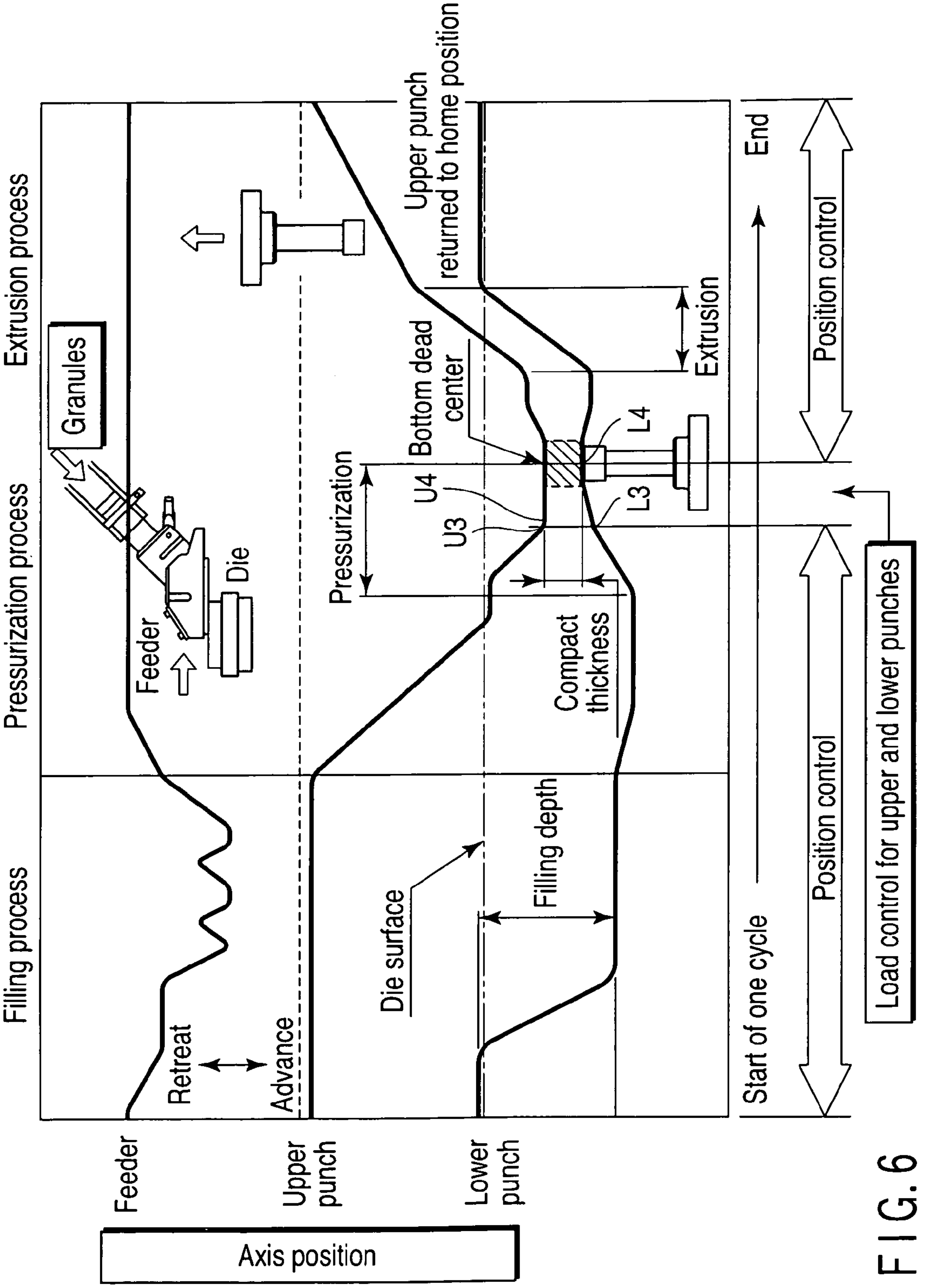
FIG. 6 is a position-time diagram of the upper and lower punches in one cycle of an alternative compression molding method.
Figure 7A:
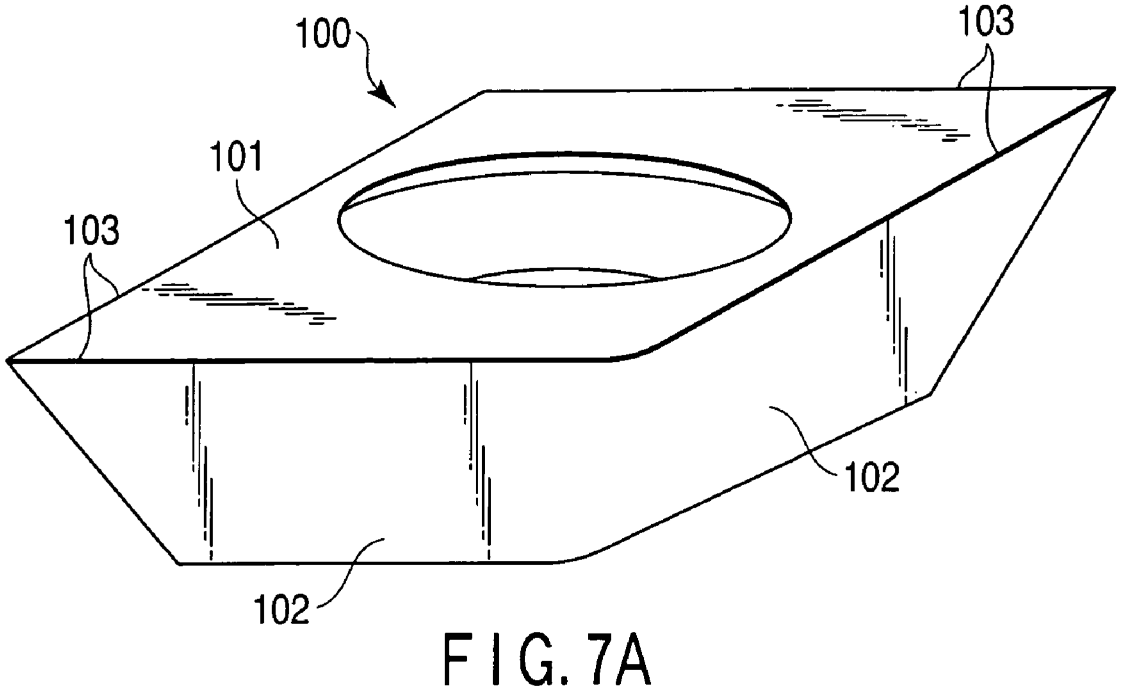
FIG. 7A is a view showing an example of a positive-type cutting insert manufactured by the alternative compression molding method.

Another example of the compression molding method to which the present invention is applied will now be described with reference to the drawings. FIG. 6 is a diagram showing changes in vertical position of the upper and lower punches 40 and 41 in one cycle (a change in lateral position along the upper surface of the die 60 is shown for the feeder 80). FIG. 7A shows a positive-type cutting insert manufactured by the compression molding method.

This compression molding method uses a machine with a configuration basically the same as that of the aforementioned compression molding machine 10. Initially, the upper punch 40 is drawn out upward from the die 60, which is fixed to the middle wall 22, and moved to the retracted position. Further, the lower punch 41 is fitted in the molding space of the die 60 so as to form the bottom of the molding space. If this standby state is confirmed, the drive unit (not shown), e.g., the servomotor, solenoid, or the like, is driven to move the feeder 80 onto the molding space, whereupon the molding powder is filled into the molding space. The feeder 80 is swung several times on the molding space, in order to increase the molding powder filling efficiency and improve the accuracy of fill, and is returned to its original position. Then, the upper punch driving servomotor 30 is driven, and the ball nut or ball screw is rotated by means of the gear, timing belt, and gear. Further, the upper punch driving ball screw 32 is lowered, and the upper punch 40 is fitted into the molding space of the die 60. Thus, the molding powder in the molding space is compression-molded as the upper and lower punches 40 and 41, which are directly pressed by the upper punch driving ball screw 32 and lower punch driving ball screw 33, respectively, are slid to their stop positions (bottom dead centers).

As shown in FIG. 6, the upper and lower punches 40 and 41 first slide under conventional position control based on the set operation programs and feedback control of the position controller 50A based on the detection values from the position detection sensors 52 and the stored set values, thereby pressurizing the molding powder. After the punches are slid to set positions (positions U3 and L3 in FIG. 6) just short of their respective stop positions (bottom dead centers), only the upper punch 40 is slid to a set stop position (U4 in FIG. 6) under position control and stops when the stop position is reached. With the upper punch 40 stopped at the reached stop position, thereafter, only the lower punch 41 is slid under conventional load control based on the set operation program and feedback control of the load controller 50B based on the detection value from the load detection sensor 53 and the stored set value, and stops when the set load is reached (at L4 in FIG. 6) by the load of the lower punch 41.

The following is a detailed description of the above example. When the pressurization (pressurized part is indicated by the arrow) is started in the aforementioned manner, the upper punch 40 descends to the estimated stop position obtained for design in a position control state, that is, position U3. In this position, the upper punch 40 closely contacts the inner surface of the die 60.

On the other hand, the lower punch 41 ascends under position control to the position L3 that corresponds to 95% of the estimated stop position of the lower punch 41 obtained in designing the product to be molded. Thereafter, the lower punch 41 is moved under switched load control. The lower punch 41 is stopped when a predetermined value is reached by the load. This position is indicated by L4 in FIG. 6.

In order to release the compact from the pressurization, thereafter, the upper and lower punches 40 and 41 slide for the predetermined set degree under the conventional position control by the position controller 50A so as to become more distant from each other. Then, the punches slide upward with the distance between them accurately controlled. When the position where the compact is removed is reached, only the lower punch 41 stops, and the upper punch 40 returns to the standby position (see FIG. 1). The compact having reached the removal position is removed by the takeout device (not shown) incorporated in the compression molding machine and is moved to the predetermined position. In the aforementioned series of operations of the upper and lower punches 40 and 41, the respective vertical positions of the punches 40 and 41 change during each cycle, as shown in FIG. 6. At the bottom dead center, as shown in FIG. 4, the load slightly exceeds the set load. The sliding motion and stop position of the lower punch 41 are controlled by the load controller 50B so as to minimize (or approximate to zero) the excess.

The compact for the cutting insert compression-molded by controlling the load of the lower punch 41 in this manner is given a very constant density, so that the contours of its upper and lower surfaces embossed by the upper and lower punches 40 and 41 can be accurately shaped. In the cutting insert formed with rake faces on the upper and lower surfaces and cutting edges on their peripheral edge portions, therefore, the dimensional accuracy of the rake faces and cutting edges after sintering is very high. Accordingly, the accuracy of the edge position of the cutting tool fitted with the cutting insert becomes higher than in the conventional case, and the variation of the edge position at the time of the replacement of the cutting insert is smaller than in the conventional case. Thus, the finished surface accuracy obtained by means of the cutting tool is improved considerably. Also in the case where the peripheral surfaces of the cutting insert are ground after sintering, error and variation of the grinding tolerance are so small that the grinding tolerance can be reduced. Thus, the grinding costs and material costs can be cut. Furthermore, fluctuation of the density of the compact is very small, and the sintered alloy characteristics are high and stable. Thus, a strong alloy can be obtained, so that an excellent tool life for the cutting edge of the cutting tool can be stably obtained.

Figure 7B:
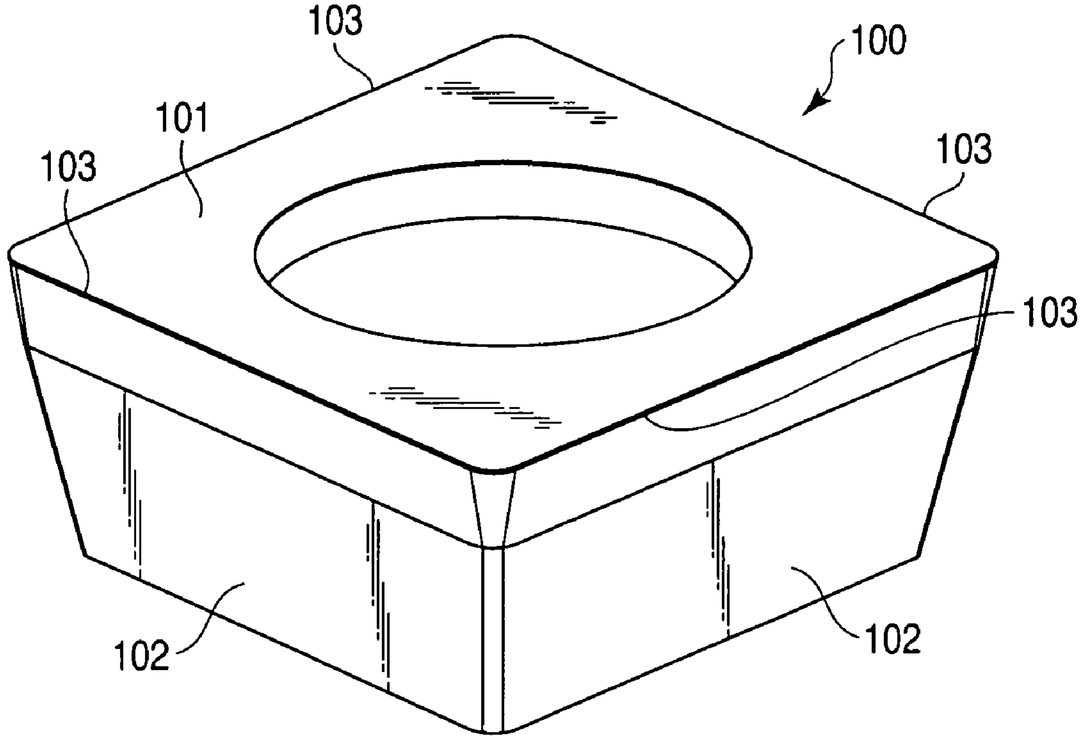
FIG. 7B is a view showing another example of the positive-type cutting insert manufactured by the alternative compression molding method.

Preferably, in this compression molding method, the contour of the distal end face 40*a* of the upper punch is greater than that of the distal end face 41*a* of the lower punch, and the upper and lower punches 40 and 41 are arranged coaxially with each other. In this case, the manufactured cutting insert is a positive-type cutting insert, such as the one illustrated in FIG. 7B. According to this compression molding method, the lower punch 41*a* is controlled for the set loads for the upper and lower punches 40 and 41 after the distal end face 40*a* of the upper punch is accurately positioned at the bottom dead center. Therefore, the contour of the upper surface of the cutting insert embossed by the distal end face 40*a* of the upper punch is accurately formed on the compact for the cutting insert. Thus, the contour of the rake face on the upper surface and the cutting edges on the peripheral edge portions are molded very accurately.

The inner wall of a bore 61 of the die 60 corresponding to peripheral surfaces 102 of the cutting insert is gradually inclined inward from the upper surface of the die 60 toward the lower surface. If the distal end face 40*a* of the upper punch is located above the upper surface of the die 60, the flank faces 102 formed on the peripheral surfaces that extend from the cutting edges 103 are formed individually with flat lands without a clearance angle (or at a clearance angle of 0°), which extend just below and along the cutting edges 103, corresponding to the vertical distance between the upper punch and die. Preferably, in the cutting tool, the flat lands should be minimized in size, since they contact the workpiece to be cut earlier than the ridges of the cutting edges 103 and hence cause poor cutting performance and extraordinary flank wear. Although these problems are conventionally avoided by grinding the flank faces involving the flat lands, that is, the peripheral surfaces of the cutting insert, this entails high costs. If the distal end face 40*a* of the upper punch is located below the upper surface of the die 60, moreover, there is a problem that the peripheral edge portions of the distal end face 40*a* of the upper punch collide with the inner wall of the bore 61 of the die 60, so that the upper punch 40 and die 60 may break.

According to this compression molding method in these circumstances, the stop position of the upper punch 40 can be accurately located on the height level of the upper surface of the die 60. Therefore, the width of the flat lands just below the cutting edges of the sintered cutting insert can be closely approximated to zero. Accordingly, degradation of cutting performance and sudden increase in flank wear can be prevented, and in addition, the peripheral surfaces of the cutting insert need not be ground, so that there is no problem of high costs.

In operation, the lower punch 41 stops at its stop portion when the set load is reached. Since this stop position fluctuates depending on fluctuations of the fill of the molding powder and the like, the thickness of the compact for the cutting insert may vary, in some cases. After sintering, however, the lower surface of the cutting insert is ground by means of a grinding wheel or the like, so that the cutting insert is finished to an accurate thickness.

In contrast with the method described above, the upper and lower punches 40 and 41 may be controlled contrariwise. Specifically, after the upper and lower punches 40 and 41 are first slid to positions just short of their respective estimated stop positions for design under position control, only the lower punch 41 is slid to and stops at the set estimated position under position control. With the lower punch 41 stopped at the reached estimated stop position, thereafter, only the upper punch 40 is slid under load control based on the set program and feedback control, and stops when the set loads are reached by the loads of the upper and lower punches 40 and 41. According to this method, the relatively wide flat lands are formed on the peripheral surfaces that adjoin the upper surface of the compact. After sintering, however, the grinding work to adjust the thickness of the cutting insert to a desired dimension is preferentially performed on the upper surface on which the rake face 101 is formed. Therefore, the accuracy of the contour of the rake face 101 can be reconciled with the sharpness of the cutting edge. If the peripheral surfaces, as well as the upper surface, are subjected to the grinding work after sintering, the accuracy of the contour of the rake face 101 and cutting edge shape and the sharpness of the cutting edge are further improved.

In this compression molding method, moreover, the distance between the respective distal end faces 40*a* and 41*a* of the upper and lower punches in their stop positions is converted from the detection values of the position detection sensors 52 and compared with the tolerable value input to the storage section by the comparison section of the position controller 50A, and it is determined whether or not the value is within tolerance. If the value is out of tolerance, the compact is sorted out as a non-conforming product and rejected as molding powder for reproduction without being delivered to a subsequent sintering process. Thus, non-conforming products are reduced and the molding powder can be saved, so that the economy is improved. This processing is similar to the aforementioned dealing method.

Preferably, each of the upper and lower punches 40 and 41 should be composed of a plurality of split punches that can slide independently of one another. The individual split punches are independently slidable by means of ball screws 30 and 31, and their slide degrees and loads can be controlled separately. According to these split punches, loads acting on the upper and lower surfaces of the compact for the cutting insert can be accurately controlled for each split division, so that the density of the compact can be made more uniform.

The present invention is applicable to a compression molding method for a cutting insert, such as a method of molding a cutting insert.

What is claimed is:

1. A compression molding method for a cutting insert, in which molding powder filled into a molding space defined by a die, an upper punch, and a lower punch is compression-molded by the upper and lower punches, comprising:

sliding both the upper and lower punches individually to positions just short of estimated stop positions obtained for design by means of a position controller; and then sliding the punches by means of a load controller so that a predetermined pressure is reached.

2. A compression molding method for a cutting insert according to claim 1, wherein respective distal end faces of the upper and lower punches have identical contours and are coaxial with each other.

3. A compression molding method for a cutting insert according to claim 2, wherein the distance between the stopped upper and lower punches is detected by position detection sensors for the upper and lower punches, and a compression-molded product is sorted out when the distance is concluded to be outside a set tolerable range.

4. A compression molding method for a cutting insert according to claim 1, wherein each of the upper and lower punches is composed of a plurality of split punches, which are slidable independently of each other.

5. A compression molding method for a cutting insert according to claim 2, wherein each of the upper and lower punches is composed of a plurality of split punches, which are slidable independently of each other.

6. A compression molding method for a cutting insert according to claim 3, wherein each of the upper and lower punches is composed of a plurality of split punches, which are slidable independently of each other.

7. A compression molding method for a cutting insert, in which molding powder filled into a molding space defined by a die, an upper punch, and a lower punch is compression-molded by the upper and lower punches, comprising:

sliding both the upper and lower punches individually to positions just short of estimated stop positions obtained for design by means of a position controller, then sliding one of the punches to the estimated stop position obtained for design by means of the position controller; and then further sliding the other punch by means of a load controller so that a predetermined pressure is reached.

8. A compression molding method for a cutting insert according to claim 7, wherein the contour of the distal end face of one of the punches is greater than and coaxial with that of the distal end face of the other punch.

9. A compression molding method for a cutting insert according to claim 8, wherein the distance between the upper and lower punches at a bottom dead center is detected by position detection sensors for the upper and lower punches, and a compression-molded product is sorted out when the distance is concluded to be outside a set tolerable range.

10. A compression molding method for a cutting insert according to claim 7, wherein each of the upper and lower punches is composed of a plurality of split punches, which are slidable independently of each other.

11. A compression molding method for a cutting insert according to claim 8, wherein each of the upper and lower punches is composed of a plurality of split punches, which are slidable independently of each other.

12. A compression molding method for a cutting insert according to claim 9, wherein each of the upper and lower punches is composed of a plurality of split punches, which are slidable independently of each other.

* * * * *